United States Patent [19]
Chasek

[11] Patent Number: 5,237,507
[45] Date of Patent: Aug. 17, 1993

[54] SYSTEM FOR DEVELOPING REAL TIME ECONOMIC INCENTIVES TO ENCOURAGE EFFICIENT USE OF THE RESOURCES OF A REGULATED ELECTRIC UTILITY

[76] Inventor: Norman E. Chasek, 24 Briar Brae Rd., Stamford, Conn. 06903

[21] Appl. No.: 633,070

[22] Filed: Dec. 21, 1990

[51] Int. Cl.⁵ .............................................. G06F 15/20
[52] U.S. Cl. ............................. 364/464.04; 324/116; 364/464.01
[58] Field of Search ............................. 324/116, 142; 340/870.02, 870.03; 364/464.01, 464.04, 483

[56] References Cited

U.S. PATENT DOCUMENTS

| | | | |
|---|---|---|---|
| 3,688,271 | 8/1972 | Rouse | 340/870.03 |
| 4,396,915 | 8/1983 | Farnsworth et al. | 340/870.03 |
| 4,399,510 | 8/1983 | Hicks | 364/464.04 |
| 4,511,979 | 4/1985 | Amirante | 364/464.04 X |
| 4,516,213 | 5/1985 | Gidden | 364/464.04 X |
| 4,621,330 | 11/1986 | Weikel | 364/483 |
| 4,803,632 | 2/1989 | Frew et al. | 364/464.04 |
| 4,814,996 | 3/1989 | Wang | 364/464.04 |
| 4,852,030 | 7/1989 | Munday | 364/464.04 X |

*Primary Examiner*—Edward R. Cosimano

[57] ABSTRACT

The electric utility industry is inexorably being forced into a less regulated, more competitive, and more conservation oriented mode of operation. It is therefore inevitable that electric energy will have to increasingly resemble a commodity that is bought and sold on free and competitive markets. This invention describes a system and method to emulate and automate such treatment of electric energy with minimal disruption to the public service oriented utility concept. The system for achieving this is comprised of; sensors that monitor 1) out-of-doors temperatures, 2) mean power supplied by each generator in a utility system during each hour and 3) energy consumed by each customer per hour recorded in calendar-time; computers that are programed with software developed from algorithms that are described in the invention; and a subsystem that feeds back pricing information to consumers. The algorithms continuously generate demand-related hourly prices and bonus/surcharge distributions (during high demand periods), while keeping gross revenues fixed. Taken together all this facilitates inter-utility competition, minimizes regulation, impels more efficient use of utility assets, and provides economic incentives for conservation.

5 Claims, 5 Drawing Sheets

SYSTEM FOR DEVELOPING REAL TIME ECONOMIC INCENTIVES TO ENCOURAGE EFFICIENT USE OF THE RESOURCES OF A REGULATED ELECTRIC UTILITY

BACKGROUND OF THE INVENTION

The electric utility industry is inexorably being forced by both regulators and new law into less regulated, more competitive and more conservation oriented business operations. The eventual success of this new direction will depend on whether the economics of electrical energy can be made to emulate those of a commodity. As a commodity the price of electricity would reflect 1) true costs, 2) supply and demand conditions, and 3) competition. It is the contention of this invention that electric energy can assume most of the economic properties of a commodity yet remain regulated, thus benefiting the public from the advantages of both the free and competitive marketplace and a totally responsible utility.

A method and system that seamlessly reflects cost, supply & demand, and competition through a continuously adjusted, demand-related price with capped gross revenues is the essence of this invention. The full system automates that pricing, and feeds back appropriate economic information to consumers. The complete system combines hourly consumer charges based on the demand related pricing with bonus/surcharge distributions.

By capping gross revenues it is possible to allow hourly prices to fluctuate, which makes possible commodity-like pricing of electricity while eliminating the frequent, complex & lengthy proceedings increasingly needed for rigidly regulating electric rates. Replacing rate regulation with process while retaining a modicum of regulation which would be needed to keep the integrated utility concept intact.

Capped gross revenues, when coupled with demand-related pricing, eliminates any revenue related disincentives for utilities to encourage conservation. Also those customers who practice conservation would see their electric bills drop while those who do not would see their bills rise. Hence a built-in market driven dynamic is created to encourage conservation.

This demand related pricing makes electricity much cheaper during low demand times and quite expensive during heavy demand times, particularly when combined with the bonus/surcharge distributions. This impels the more efficient utilization of utility assets by flattening load factor.

The introduction of this invention's demand-related pricing, when linked to a procedure for predicting the upcoming hour's prices for each utility in a pool, and the exchange of that information plus the amount of energy each utility would have available for export, or would need to import, sets up inter-utility competition. Lower priced electricity from a utility should result in greater exports, which further lowers the price until full capacity operation is realized at which point peak profits would be realized. Less efficient producers would earn greater profits if they would import cheaper power. Hence a competitive dynamic is introduced that would keep prices low within the framework of minimal regulation.

SUMMARY OF INVENTION

The preferred embodiment of this invention incorporates apparatus that generates, disseminates and displays information which permits a step-by-step introduction of an electronically simulated free market economic operation by regulated electric utilities and their associated power pool. The apparatus includes sensors, computers, and displays that are linked by telephone lines and radio transmissions. The sensors monitor individual consumer energy usage as a function of hourly calendar-time, power output from each utility's generators, and mean out-of-doors temperatures.

The computers receive, assemble and digest this data to determine a post facto hourly demand-related price which is later multiplied with each consumer's hourly energy consumption, correlated in calendar-time, for billing purposes. The premise underlying the demand-related price is that all fixed costs attributible to any generator slot in the utility's system is charged off only when it is online, the charge-off being inversely related to the on-line duty cycle and mean power, averaged over a month, and directly related to per diem fixed costs and the weighted ratio of mean power being delivered by each generator to total system mean power delivered during any given hour.

The computers also determine a bonus/surcharge distribution as demand approaches supply limits. This condition is predicted by out-of-doors temperatures. Whether a bonus or surcharge is to be distributed to any specific customer depends on the relative change in energy consumption by that customer as temperatures move beyond prescribed thresholds.

The computers also support inter-utility competitive pricing by posting for every upcoming hour, estimates of each utility's upcoming demand-related energy price, and how much energy it will have available for export or will need to import. Buy or sell decisions are then made, followed by post facto price recomputations and settlements.

These computer functions are defined by mutually supportive algorithms that are unique to this invention. The algorithms are described by mathmatical, verbal, and flow diagram expressions presented in the detailed description of invention.

An informational feedback loop that incorporates the consumer is a necessary ingredient of the system. An important function of the feedback is that it serve as a low cost, easily understood teaching tool. The preferred embodiment for this feedback would have two formats, one a printed, post facto, matrix-like bill which is mailed to each customer, and the other being real-time electronic information disseminated by radio transmissions to each consumer. Two digits are transmitted, one being a real-time-price index for the current hour, and the other a bonus/surcharge index. The approach described for implementing the real time feedback lends itself to time sharing of existing commercial broadcast transmitters, and to the adaptation of room clocks into dual function time-telling and real-time economic feedback terminals.

This system can be superimposed onto an operational utility with little disruption, since it can be introduced in a step-by-step manner. It does not have to encompass all customers, but could be initially restricted to certain service classifications. It also can be implemented one economic function at a time and still be effective.

The various aspects and advantages of this invention will be more fully understood from a consideration of the following detailed description in conjunction with the accompanying drawings in which:

DETAILED DESCRIPTION OF THE INVENTION

Figure 1:
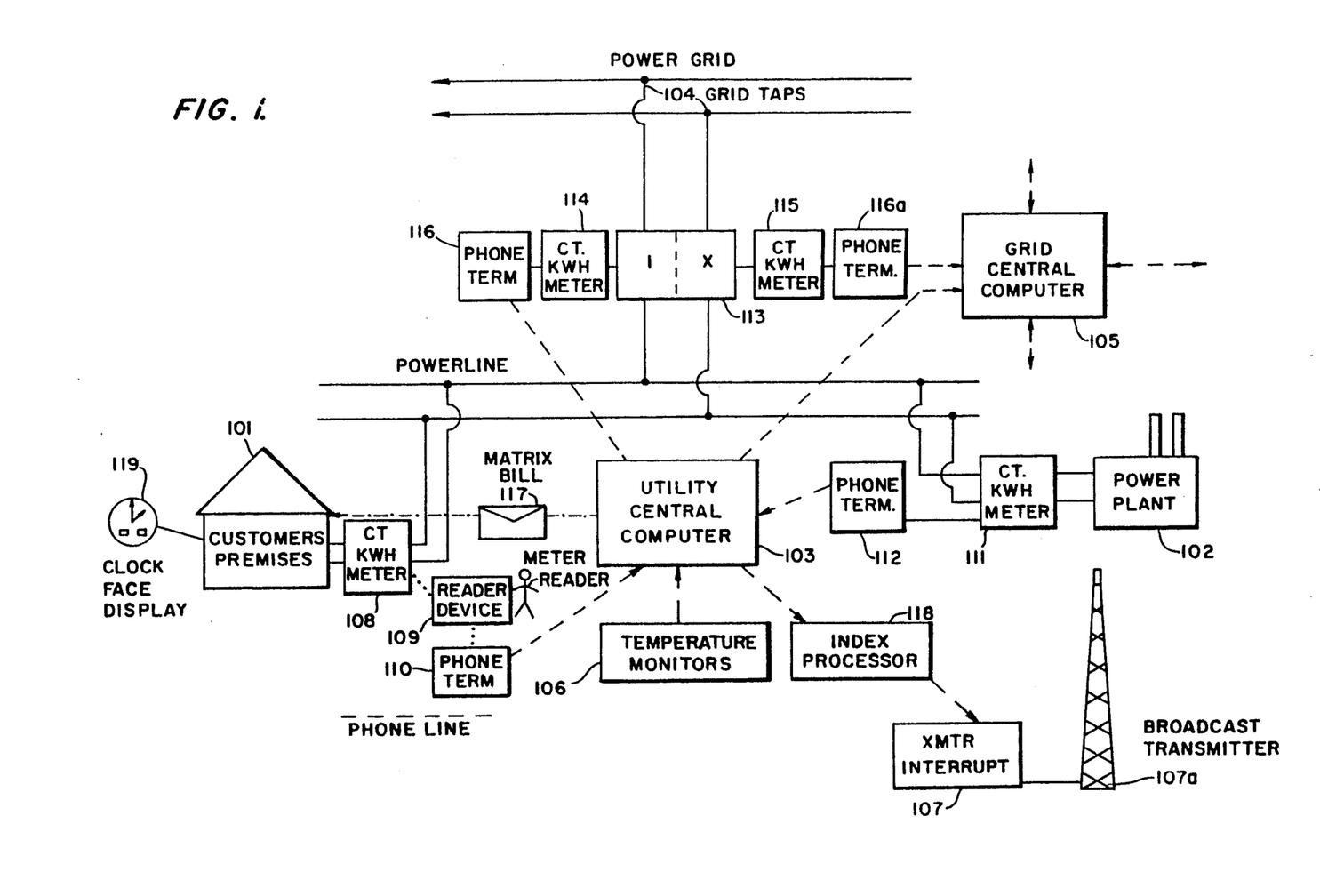
FIG. 1 illustrates the various geographically dispersed elements of the system and how they are linked together.

Referring to the drawings in detail, FIG. 1 shows pictorially the major, geographically dispersed elements that comprise the illustrative embodiment of a fully implemented system. These are, customer premises, 101, which could number in the hundreds of thousands for a typical utility; power plants, 102, which could number ten or so for each utility in the pool; each utility's central computer, 103; each utility's power pool or grid tap, 104; power pool central computer, 105; out-of-doors temperature monitors, 106, which could number thirty or more per utility, and shared broadcast radio transmitters, 107, which could number ten or so per utility.

Each customer's premises contains one or more calendar-time, watt hour meters, 108, which keep a running record of energy consumption, typically by the hour, that is correlated with calendar-time. These meters are interrogated on a monthly basis by meter reading devices, 109, which temporarily store the running records of many meters and insert the time and date of each reading. Batches of these records are periodically transferred to computer 103 through anyone of numerous telephone data terminals, 110. A similar running record of mean hourly power supplied to the utility's customers by each generator in the utility's system, is retained by recording meter, 112. The stored record of each of these meters is periodically transferred to computer 103 via telephone data terminals, 111, along with the time and date of the readout.

Power pool, or grid, directional tap, 113, feeds a sample of imported energy to calendar-time energy meter, 114, and a sample of exported energy to meter 115. The stored record of meter, 114, is periodically transferred to computer 103 via telephone data terminal, 116, where it is multiplied by a post facto price and then appropriately factored into the utility's hourly energy price. The stored record of meter, 115, is periodically transferred to grid central computer 105 via phone terminal 116a where it is processed along with estimated upcoming demand-related prices determined in computer 103. Computer 103 also determines the post facto hourly prices for energy supplied to utility customers and the hourly charges billed to each customer. Each bill is a sum of the products of hourly prices and customer's calendar-time KWH consumption. To this is added any bonus/surcharge distribution, which computer 103 also determines. Computer 103 also prints out matrix-bill, 117, which contains a post facto record of the customer's energy consumption pattern. Matrix-bill, 117, is mailed to each customer. It serves as both a bill and an instructional guide in how and when to best use electricity to realize its lowest cost.

Computer 105 receives estimates of upcoming hourly prices from each utility in a power pool along with estimates of how much energy each utility has available for export in the upcoming hour. It collates and then distributes this information to each pool member where buy and sell decisions are made. Computer 105 later helps settle inter-utility accounts by splitting differences between the estimated price and the post-facto computed price.

Index processer, 118, receives hourly demand-related price estimates and temperature data from computer, 103, from which it creates, via a look-up-table, two single digit index numbers, each preferably ranging between 0 and 9, each characterizing the price and bonus/surcharge protocol that is estimated to be in effect during the hour. The numerical indices are fed to broadcast transmitter-interupt-switch, 107, where they are stored prior to being fed in during a momentary preemption of transmitter, 107a, coinciding with a program quiet moment. These indices are received by receiver/display device, 119, on the consumer's premises, where they are stored for an hour for the purpose of creating a continuous-appearing display.

Receiver/display device 119 is illustrated here as being integrated into a household clock.

The fully implemented system described above can also function in various partial implementations. For example, customers can be batched by their service classification with only one or two classifications connected up to the "free market system". Also a single utility can implement the system without a link to a power pool. It is also not essential to include the bonus/surcharge distribution or the matrix bill or the broadcast real time display. All of these can be gradually incorporated over time to eventually realize a fully implemented system.

The post facto demand-related hourly base price charged by each utility for the energy it supplies is determined in computer 103 from software that is developed from the TEP algorithm. This algorithm consists of a TEFC factor in which cost and market factors are blended, a $K_{gr}$ multiplier which keeps monthly gross revenues fixed, a composite hourly fuel cost/KWH or FC, and a profit/KWH or P, $TEP = TEFC(K_{gr}) + FC + P$ TEFC is expressed mathematically as;

$$TEFC_n = [WC_1 + WC_2 + \ldots + WC_n]/[\bar{\bar{P}}_1 + \bar{\bar{P}}_2 + \ldots \bar{\bar{P}}_n]$$

where $TEFC_n$ is a demand modified, fixed cost price factor when n generators are on-line, simultaneously.

$WC_n$ is the weighted composite cost of the n th generator $\bar{P}_n$ is the mean power output of the nth generator averaged over a month where $$WC_n = \frac{T_o(\bar{P}_1C_1/T_o + \bar{P}_2C_2/\Delta T_2 + \ldots + \bar{P}_nC_n/\Delta T_n)}{\bar{P}_1 + \bar{P}_2 + \ldots + \bar{P}_n}$$

and $\bar{P}_n$ is the mean power supplied by the nth generator averaged over one hour or capacity of nth generator $C_n$ is the fixed per diem cost associated with the nth generator $T_o$ is an empirically determined, fixed duration period whose least value is 24

$\Delta T_n$ is time interval in hours when n generators are simultaneously online during $T_o$ period $P_1$ is the baseline generator that is online 24 hours per day An optional enhancer-multiplier can be generated to make TEFC even more responsive to demand. This multiplier can take the form of $P_h(t)/P_d$ where $P_h(t)$ is the mean hourly power demand of the entire system during the course of a day, and $P_d$ is the mean demand averaged over a 24 hour day.

The gross revenue factor, $K_{gr}$, would be generated once per extended interval of time that it is active. A sub-routine algorithm describes this factor. The algorithm is described by the following expression that is total fixed cost divided by estimated gross revenues from TEFCs for the month:

$$K_{gr} = \frac{(C_1 + C_2 + \ldots + C_n)30}{\Sigma TEFC_1(E_1 + E_2 + \ldots + E_n) + TEFC_2(E_1 + E_2 + \ldots + E_n) + \ldots + TEFC_m(E_1 + \ldots + E_n)}$$

$30(C_1 + \ldots + C_n)$ is the monthly fixed costs by generators 1 through n $TEFC_m$ is TEFC for the mth hour in the month $(E_1 + E_2 + \ldots + E_n)$ is the total energy provided in time slot n The fuel cost per KWH in the entire system is a weighted composite of all individual fuel costs used during a 24 hour period which is expressed by the following algorithm:

$$FC_c = \frac{FC_1E_1 + FC_2E_2 + \ldots + FC_nE_n}{E_1 + E_2 + \ldots + E_n}$$

where $FC_n$ is the fuel cost per KWH used by generater n, and $E_n$ is the energy generated by generator n.

Pricing export power requires estimating the exporter's TEP for each upcoming hour. This estimate could be based on market considerations alone since this price does not have to be regulated. The export price estimate could also be based on a TEP taken from a similar day and hour from a previous month of the exporter's post facto demand related price (TEP) record, modified by a demand/price multiplier. This multiplier activates a price surge that must occur if demand approaches generating capacity. The importer's price, $P_{im}$, could then be expressed as:

$$P_{im} = \frac{TEP_{exr}[M]}{1 - [P_d/P_c]^n}$$

where $TEP_{exr}$ is the exporter's TEP during a given hour $P_d$ is the maximum power demanded during the hour $P_c$ is the maximum capacity of the exporter's system n is an empirically derived constant M is ratio of selling price to buying price Each utility's composite TEP,(or demand-related price), is the weighted composite price of locally generated power and imported power, which can be expressed as follows:

$$TEP_c = \frac{TEP_L E_L + P_{im}E_{im}}{E_L + E_{im}}$$

where $TEP_c$ is the local, base composite price for customers $TEP_L$ is the computed TEP for locally generated power $E_L$ is total locally generated energy, for the hour $P_{im}$ is the exporter's TEP (modified), for the hour $E_{im}$ is the amount of energy imported, for the hour The actual price charged to a specific customer would be $TEP_c$ multiplied by a service classification constant which is predetermined for each type of customer.

The bonus/surcharge algorithm is comprised of three stages, 1) indentifying a specific time interval as being eligible for B/S distributions, 2) determining which customer is eligible for either a bonus or surcharge in any particular time increment, and 3) determining the amount of the bonus or surcharge attributed to each customer during any eligible time interval. Stage 1 requires a criterion for establishing a particular time slot as representing an above normal demand. This is done by out-of doors temperature indications and apriori calender knowledge, like day of week and season. Specific customer eligibility is determined by whether, during the apriori B/S period, that customer uses more or less energy than a baseline amount established for that customer on a typical day. The amount of the surcharge rate per KWH would be determined by the following expression:

$$S_s = \frac{T - 80}{a} \bar{r} \qquad S_w = \frac{30 - T}{a} \bar{r}$$

(Only positive values for $S_s$ & $S_w$ are used)

where $S_s$ is the summer surcharge rate and $S_w$ the winter rate; T is the actual representative out-of-doors temperature; 80° and 30° are the threshold high demand summer and winter temperatures; and "a" is a variable selected by each utility based on actual experience.

The bonus rate per KWH is determined from the following expressions:

$$B_s = qS_s\bar{r}_b \qquad B_w = qS_w\bar{r}_b \qquad q = \frac{\Sigma E_s}{\Sigma E_b}$$

$$\Sigma \bar{r}_s SE_s = \Sigma \bar{r}_b BE_b$$

where $B_s$ is the summer bonus rate per KWH; $\bar{r}_s$ is a quantity taken from a look up table, LUT, which is illustrated by Table I; $\bar{r}_b$ is the bonus version of $\bar{r}_s$ as defined by the LUT; $\Sigma E_b$ is a running sum of energy-time increments that are bonus eligible and $\Sigma E_s$ is the running sum for surcharge eligible energy-increments.

TABLE I

Sample LUT for $\bar{r}_b$ and $\bar{r}_s$

| T | −.2 | −.1 | 0 | +.1 | +.2 | T |
|---|---|---|---|---|---|---|
| 80° | +1. | +.6 | +.05 | −.6 | −1. | 30° |
| 85° | +1.1 | +.7 | +.07 | −.7 | −1.1 | 20° |
| 90° | +1.2 | +.8 | +.1 | −.8 | −1.2 | 10° |
| 95° | +1.3 | +.9 | +.15 | −.9 | −1.3 | 0° |
|  | $\bar{r}_b$ |  |  | $\bar{r}_s$ |  |  |

$\Delta E$ is the difference in energy consumption, during an eligible B/S time interval, between the actual energy consumed and the energy determined during a more typical day which establishes a baseline energy consumption for each customer during each time unit of that typical day. For this sample table, if the out-of-doors temperature is 90° F. and the energy consumption for a particular hour is 20% above the baseline level, then $\bar{r}$ is −1.2, and elibible for a surcharge.

Figure 2:
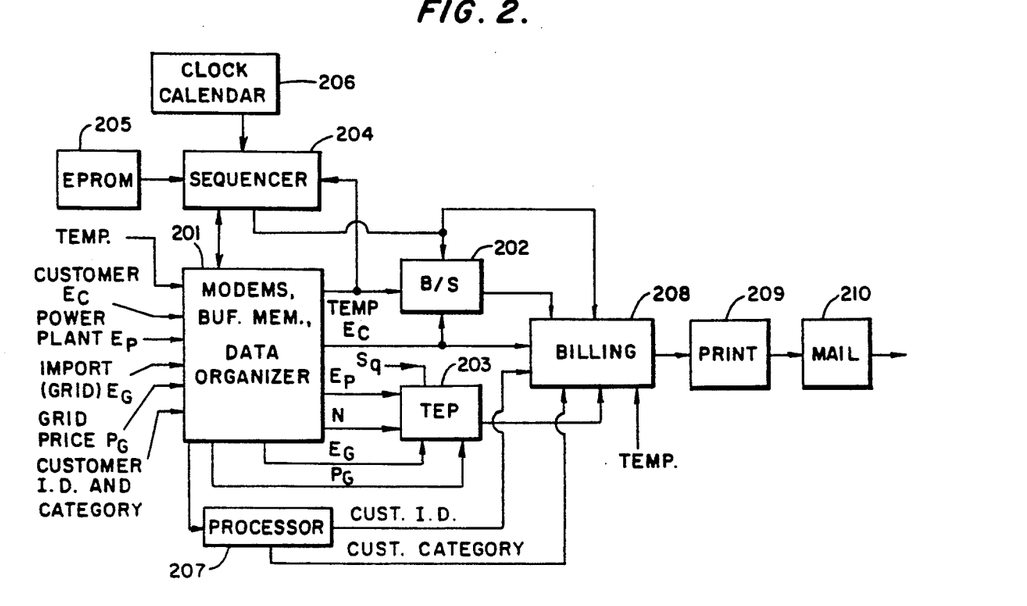
FIG. 2 is a flow diagram indicating the major processes that take place in the utility central computer.

The implementation of the TEP and B/S algorithms is shown in FIG. 2 where it is illustrated as a flow diagram indicating computer system processes. Block 201 is comprised of modems, buffer memories, a data organizer, and RAMs, or random access memories. The input data consists of temperatures, customer energy consumption per unit time and customer ID and rate categories, generator energy output per unit time and generater ID, imported energy from grid per unit calender time, and the price for the imported energy per unit of calender time. The data organizer organizes the data so it fits in with common calender-time. Each generator energy column includes a secondary column of 0's and 1's, where the 0 indicates zero online power during the time unit, and 1 indicates energy being supplied during that time unit. The temperature data and each customer's energy consumption data is fed into block 202 where the B/S process takes place. Generator energy, import energy, and grid-import price are fed into block 203 where the TEP algorithm process take place. Block 204 is a sequencer that steps the data through the process and determines which time interval is a B/S interval from the temperature data, clock-calender 206 information and from EPROM 205 which stores holiday information for the year. Block 207 receives customer-rate category and identification information from which it adds a price correction based on the customer category, i.e. residential, industrial. This information is fed along with customer ID, to block 208 where the matrix-billing information is developed. This data flow into block 209 where printing occurs and then into block 210 where mail processing takes place. Block 208 also receives information from the B/S and TEP blocks.

Figure 2A:
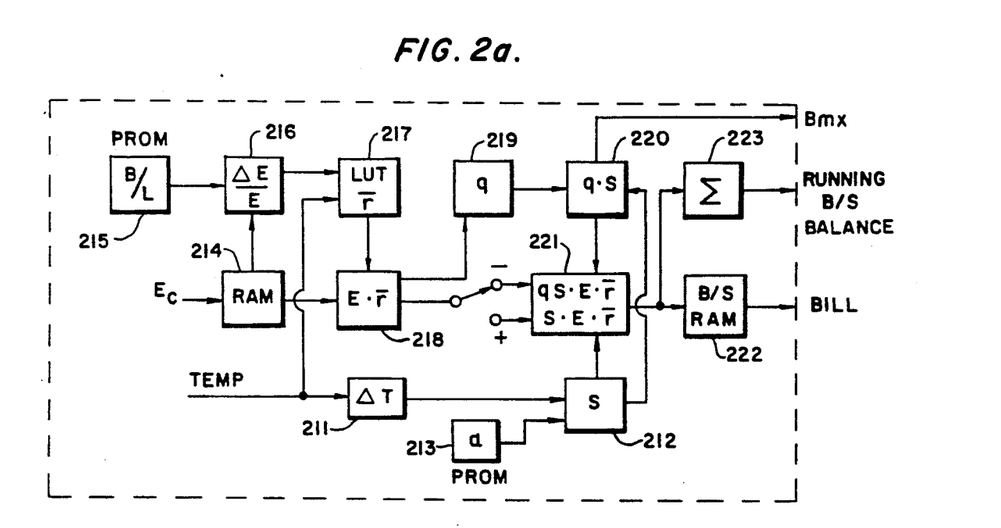
FIG. 2a is a detailed flow diagram showing the steps in the bonus/surcharge algorithm.

FIG. 2a illustrates how the B/S algorithm is executed through block diagram steps, as follows: The hourly temperature readings are fed into block 211 where the differences are taken from the B/S threshold temperatures stored in the block. Winter and summer threshold differences are fed into block 212 along with the adjustable constant "a" from PROM 213. From this information block 212 determines the surcharge rate for each unit of time and stores that information. Concurrently, the customer energy consumption is transferred to RAM 214, where that RAM's information is compared with the data stored in PROM 215 which contains baseline energy consumption per unit time for every customer. A comparison is performed in register 216 where $\Delta E/E$ is computed and cross referenced with temperature in Lock-up-Table 217 where $\bar{r}$ is determined and fed into multiplier register 218 along with energy data from block 214. The E·$\bar{r}$ products are fed into block 219 where q is determined. The q factor can be determined statistically or by estimating it and then making correction later, or by grinding through the sum of all bonus eligible energy units and dividing that sum by the sum of all surcharge eligible energy units.

The q and S from block 212 are fed into register 220 where these factors are multiplied resulting in the bonus rate for each time unit. One output from block 220 is fed out for subsequent use in generating the matrix-bill, in this case for determining the maximum bonus any customer might be eligible for with a preferred demand pattern. Blocks 212, 218, and 220, feed into register 221 where the sign, + or −, associated with $\bar{r}$ determines whether the product E·$\bar{r}$ is multiplied by the bonus rate generated in block 220 or the surcharge rate determined in block 212. The output from 221 is then fed to B/S RAM 222 where it is kept until needed by billing, 209. This output is also fed to running adder 223 whose output provides a measure of the balance that is maintained between bonuses and surcharges being accumulated by the customers.

Figure 3:
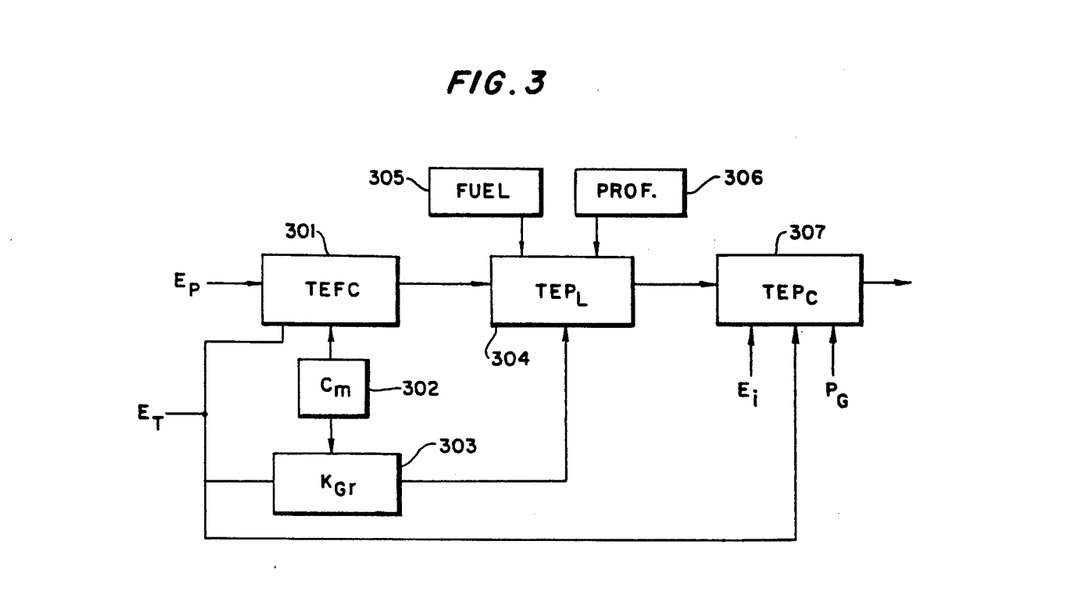
FIG. 3 is a detailed flow diagram showing the steps in the True Economic Price (TEP) algorithm.

FIG. 3 illustrates how the TEP algorithm is realized as a series of steps in a computational process performed in central computer 103. The energy supplied by each generator per unit time, $E_p$, is fed into block 301 where TEFC is computed for each time unit. The details of the TEFC algorithm process is described in FIG. 3a. PROM 302 contains the per diem fixed costs and expenses allocated to each generator slot and feeds that information, as called for, into TEFC block 301 and $K_{gr}$ block 303. TEFC block 301 also generates $E_T$, the total energy generated during each unit time interval by all on-line generators. This information is used by $TEP_L$ block 304 and $TEP_c$ block 307. The TEFC output from block 301 is fed into $K_{gr}$ block 303 and $TEP_L$ block 304. Block 304 also receives a composite fuel cost per KWH, developed from the algorithm previously described and computed in block 305 along with a profit factor per KWH stored in block 306. The computational process that takes place in 304 is the product of TEFC and $K_{gr}$ summed with the fuel cost and profit factors. This sum total for every time unit is fed into $TEP_c$ block 307 along with the imported energy and power grid price for that energy.

The composite TEP computed in this block is the energy-weighted price described earlier. The algorithm used in block 303, where $K_{gr}$ is run, is $\Sigma C_n / \Sigma E_{Tn} \cdot TEFC_m$ times a monthly factor 30.

Figure 3A:
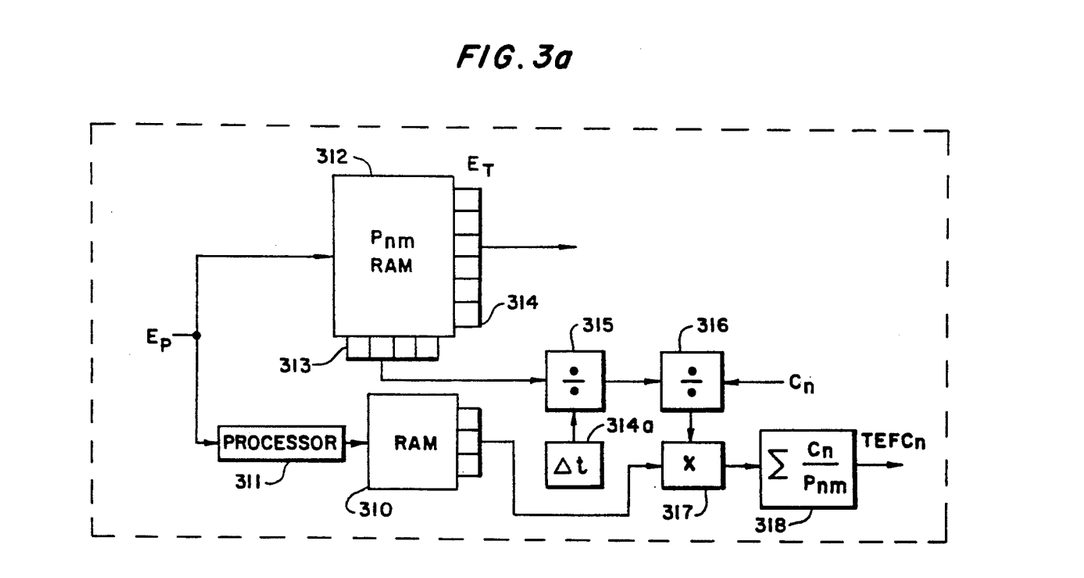
FIG. 3a is a flow diagram of the TEFC sub-process in the TEP algorithm.

FIG. 3a describes a shortcut method for determining TEFC. $E_p$ is fed into RAM 310 through processer 311 and is fed directly into RAM 312, where each column represents a generator slot and each row a unit time slot. Processer 311 substitutes a 1 if any energy is generated in that generater time slot and a 0 if no energy is generated in that slot. Row 313 contains the sum total of all energy generated by each generator during all the time slots that comprise a TEP interval, i.e. 24 hours or 7 days. Column 314 contains the sum total of the energy produced by all the on-line generaters in each time unit. Divide-register 315 divides the totals stored in row 313 by the duration of the unit time interval, 314a, thereby converting that energy quantity into a mean power quantity. That quantity is again divided in register 316 by the per diem fixed cost factor $C_n$ that represents each generator slot coinciding with each column in RAM 312. This quantity is multiplied in register 317 by the 0 or 1 that is stored in each unit time line of 311. Summing register 318 adds together each of the quantities generated in a unit time row resulting in a TEFC for each time unit.

Figure 4:
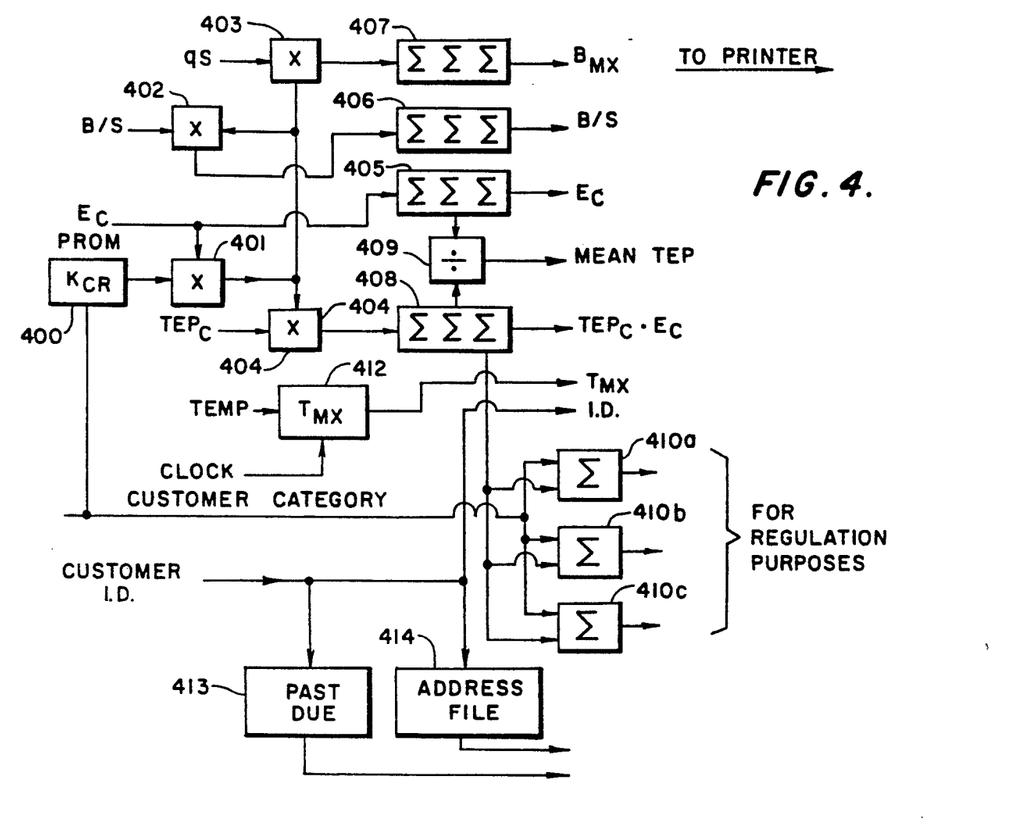
FIG. 4 is a block diagram that illustrates the processes that take place in the automated billing computer.

FIG. 4 describes the processes that occur in billing computer 208. The information produced here is needed to print the matrix-bill that is customer energy per unit time by a number that adjusts that quantity for its category rate factor, $K_{cr}$, to reflect the relative differential that different customer categories receive, i.e. residential, industrial. The customer ID include a category ID which, selects the appropriate $K_{cr}$ quantity stored in PROM 400 and multiplies each energy time unit in register 401 by that constant. The resulting products are fed to multiplication registers 402, 403, and 404 where the numbers are multiplied by; qS, which develops a quantity that approximates the maximum bonus that each customer could be eligible for; by the B/S rate to develop the actual bonus or surcharge that each customer is eligible for in any time unit; and by $TEP_c$ to develop the actual amount charged each customer for energy that has been consumed during each unit time slot. The unit time customer's energy is fed directly to triple summing register 405 where daily, weekly, and monthly energy consumption for each customer is tabulated. The outputs from registers 402, 403, and 404 feed triple summing registers 406, 407, and 408 which develop the daily, weekly and monthly $B_{max}$. B/S amounts being debited or credited to the bill, and the actual TEP bill, respectively. The daily sums from registers 405 and 408 are fed into divide register 409 to develop a mean daily price per KWH. The monthly sum from triple summing register 408 is fed to gated summing registers 410a, 410b, & 410c. The gates are controlled by the customer category gleaned from the customer's ID, in which 410a might be opened for residential customers, 410b might be for industrial customers, etc. The output from each of these registers is a total monthly TEP gross revenue by customer category, figures that would be useful for regulators. Temperature data is fed into processor 412 where the minimum or maximum temperature for each day is determined. Customer ID is used to retrieve past-due information and address information using files 413 & 414 for the printer. (Appropriate sequencing and buffer memories are implicit to this diagram.)

Figure 5:
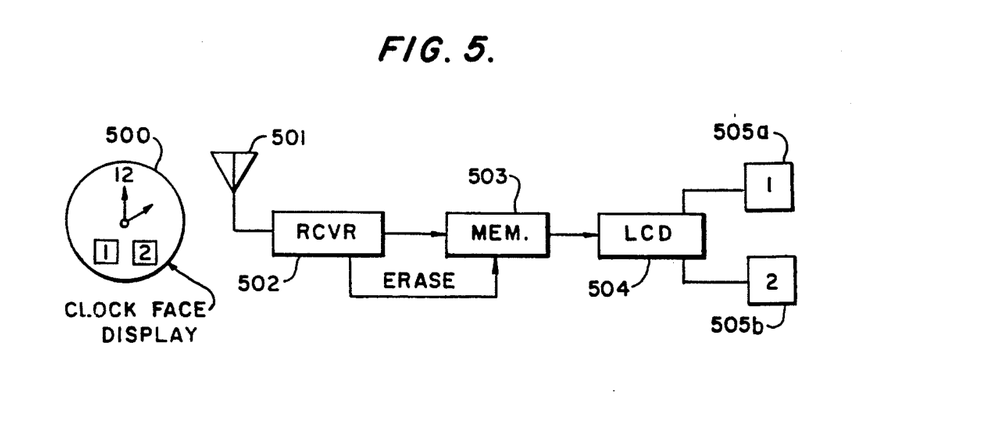
FIG. 5 is a block diagram showing the preferred means for presenting real-time indications of the energy economics to the customers.
Figure 6:
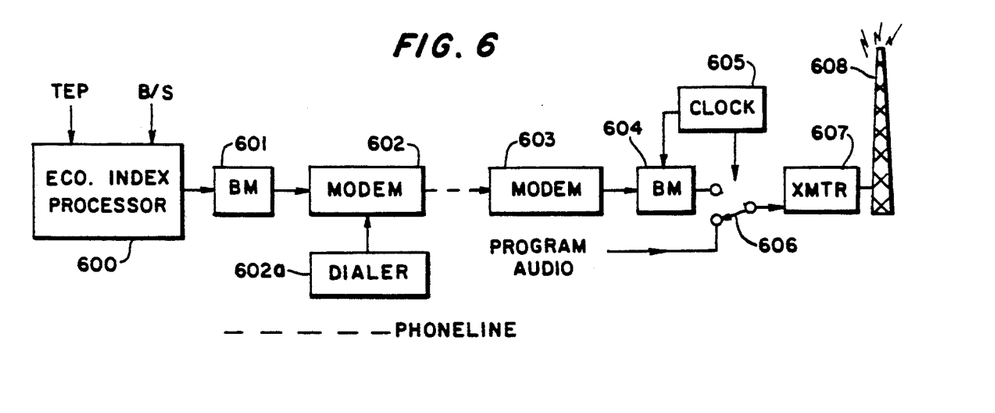
FIG. 6 illustrates an embodiment of the system that generates and broadcasts the real-time indications of the energy economics.
Figure 7:
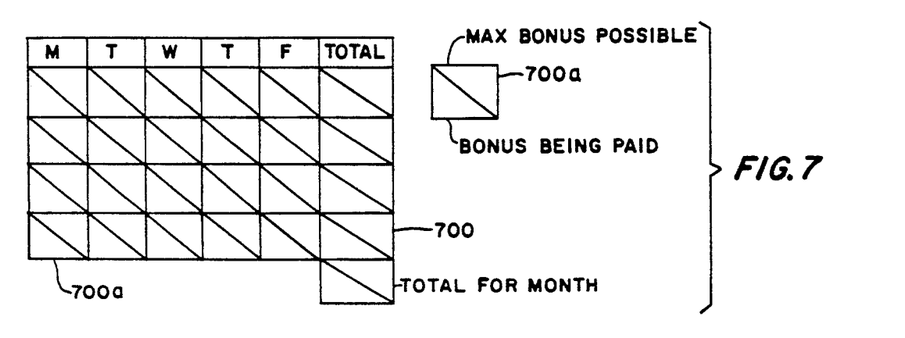
FIGS. 7 and 7a are graphic illustrations of a matrix-bill that would be mailed to each customer for the purpose of feeding back demand-price and bonus/surcharge information.
Figure 7A:
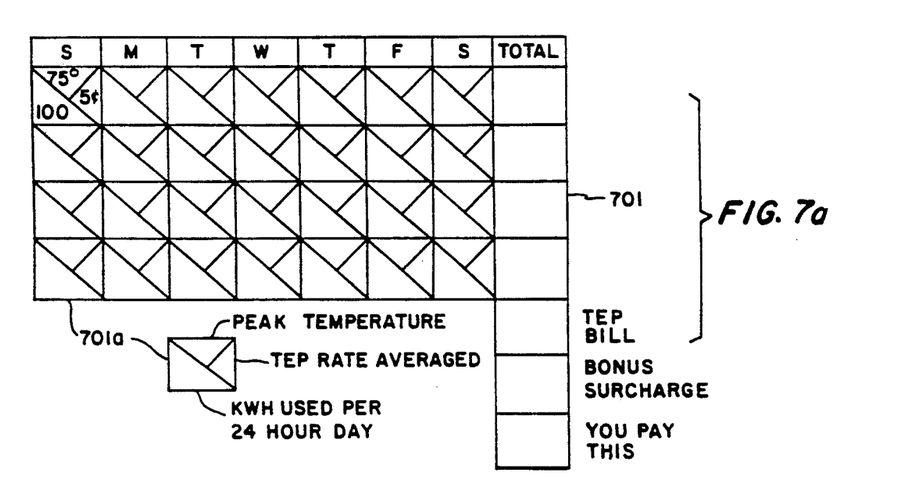

Although the matrix-bill, as described in FIGS. 7 and 7a, closes a post facto feedback loop with the customer, it would be preferable to also close a real-time loop. Such a loop is described by FIGS. 5 & 6. This loop provides economic indications directly to the consumer as described by FIG. 5. This figure shows ordinary clock, 500, with two LCD numerals added to the clock face as shown. Inside the clock is a small radio antenna and receiver, 501 and 502; a memory element, 503; LCD display circuitry 504, and the LCD numerals, 505a & 505b. Once each hour a digital word representing 0 through 9, for each numeral, is broadcast for less than one second. One numeral represents the TEP for that hour, with 1 indicating the lowest possible TEP and 9 the highest possible TEP level. The second numeral represents the level of B/S activity, with 0 representing no activity and 9 indicating maximum activity, meaning the largest possible bonuses or surcharges are being distributed. At the end of the display period, the old numerals are erased and replaced with current indicators.

FIG. 6 shows a preferred embodiment for the real time economic feedback. Processor 600 receives real time information about the power each generator in the utility is supplying to the system, and about the out-of-doors temperature difference from threshold used in B/S computations. From all this information processor 600 determines two single digit numerals, one characterizing the current price and the other the B/S distribution. Each level range of temperature difference corresponds to a discrete numeric characterization determined from a look up table. The real time price characterization uses a similar lookup table but needs an intermediary computation to estimate the actual real time price.

The two characterizing numerals are preferably readout once each hour from processor 600 and stored in buffer memory 601. Each broadcast transmitter linked to the system is periodically dialed by dialer 602a and fed this information via modem 602 and telephone lines, to modems 603. The two numerics are enterred into buffer memory 604 and stored until clock 605 activates switch 606, which momentarily preempts transmitter, 607, during quiet station times. Antenna 608 broadcasts the numeric information, along with an enabling code, to all suitably equipped consumers within radio signal reception range.

FIGS. 7 and 7a illustrate a version of the post facto bill. Matrix 700 indicates the bonus or surcharge being credited or debited for each day in the month, along with the maximum bonus that might have been attributed to that customer if demand were restrained for that day. See box 700a. Each of the boxes in FIG. 701, described in detail by box 701a, shows mean daily price, total daily energy consumption, and highest (or lowest in winter) daily temperature. Each week's sum and the total monthly charge is presented broken down into TEP and bonus or surcharge components and totaled.

What I claim is:

1. An electronic system, that when superimposed over an electric utility and its associated power pool will emulate and automate commodity-like market operations for retailed electric energy through a melding of cost, supply & demand, and competitive factors represented by demand related hourly pricing, capped gross revenues, and bonus/surcharge attributions which in turn make possible minimally regulated utility operations, more efficient use of utility assets, improved incentives for conservation, and inter-utility competition, is comprised of:

recording meters that indicate the individual customer's energy consumption by hour and date or in calendar-time;

recording meters that indicate mean hourly power supplied by each generator in a utility system in calendar time;

recording meters that indicate the amount of energy being exported and imported by a utility in calendar-time;

a recording meter system that indicates hourly out-of-doors temperatures in calendar-time throughout the utility's region;

means for collecting said metered information and feeding it into a utility's central computer;

a utility central computer which processes said metered data computing gross-revenue-capped, import-adjusted demand-related hourly prices, bonus/surcharge attributions, and customer billing;

means for feeding back condensed economic information that imparts to consumers the cost for using electric energy at any time; and a power pool sub system that collects and disseminates to all pool members anticipated demand-related hourly prices for electricity that will be available for export from each pool member, and the amount available, and then following buy decisions, computes interim credits and debits for the energy actually exported or imported, and later determines final prices by splitting differences between estimated and actual demand-related prices, and then adjusts each transaction as indicated.

2. Same as claimed in claim 1, but including a means for generating condensed real-time economic information that is fed back to any consumer in the form of demand-related price and bonus/surcharge indices, is comprised of;

means for generating said indices using projections of demand-related prices and temperatures;

radio means for distributing said indices to any customer's premises; and reception/display means for receiving, storing, and presenting said indices to those customers who desire said information.

3. A process, that is conducted within the utility central computer to determine local utility, demand-related-hourly pricing, or TEP, for the electrical energy being supplied during each hour, consists of the following steps;

assigning to each local utility generator an hourly-fixed cost, dividing said cost by each generator's on-line duty cycle which is determined over some interval, i.e. each day, and by its mean delivered power averaged over an extended-period, i.e. each month, to yield a modified cost;

multiplying said modified cost by generator-capacity weighting factors;

summing said weighted-modified costs during any hour for only those generators that are on-line during the hour producing a running-modified hourly total cost, multiplying said running costs by a factor that is separately determined for each billing period, said factor keeps gross revenues fixed with the exception of fuel cost and profit, which are separately added in, the result being a local utility demand-related price; and finally modifying said local utility price by a weighted factor representing imported energy.

4. A process, conducted within the utility central computer, for determining bonus/surcharge attributions, that is comprised of the following steps;

correlating hourly out-of-doors temperatures and customer calendar-time energy consumption deviations from previously determined norms in order to develop surcharge assessments during high demand periods as defined by out-of-doors temperature data;

accumulating a surcharge pool from those customers who have significantly increased consumption from said norms during high demand periods, with individual surcharge assessments being made proportional to increases over normal consumption during said periods and also to temperature differences from stated threshold levels; and transferring said surcharge pool into a bonus pool which is distributed to customers that either reduce or hold constant, or minimally increase consumption from said norms during said periods, with the bonus amount being proportional to a ratio o of individual bonus-eligible consumption to total system bonus eligible consumption times a deviation-from-norm factor.

5. A method for phasing-in emulated and automated free market operations for electric utilities, said operations employing computations of demand-related hourly prices that yield capped gross revenues, bonus/surcharge distribution, customer billing, and economic feedback, which when combined facilitate inter-utility competition, make more efficient use of utility assets, provide economic incentives for conservation, and minimize regulation, is comprised of the following steps:

computing a post facto demand-related-hourly-price (TEP) for the energy generated from each utility in each hour by charging off the fixed costs associated with each generator in the utility's system only when it is on-line, with said hourly price for that generator's energy contribution being inversely related to its on-line duty cycle over an interval of a day or so, and to its mean supplied power averaged over an extended period, with said quantity being modified by a weighting function which relates the hourly price contribution to the energy capacity of each generator compared to the total system capacity, with the resulting running-sum-total being modified by a post facto derived proportionality constant whose magnitude is computed to keep gross revenues at prescribed capped levels except for fuel cost adjustments, and with said running price modified by a weighting factor that inserts the price and the amount of energy imported from other utilities during each hour;

grouping customers into consumption categories and gradually introducing said demand related pricing into one group at a time or into only one or two of said groups;

computing bonus/surcharge distributions for each customer based on prescribed manipulations of out-of-doors temperatures and the change in the individual consumer's demand as a function of the out-of-doors temperature during high demand periods, this would be introduced subsequent to the introduction of the demand-related pricing;

disseminating to each interconnected utility in a pool, the amount of energy each pool member has available for export in the upcoming hour and its estimated demand-related price, then processing and executing buy orders, and after receiving the exporter's actual price, splitting any differences between said estimated demand-related export price and the actual demand-related price at the time of the sale, and finalizing each transaction with said adjusted hourly demand-related price;

combining said final adjusted demand-related price with weighting factors that reflect the price influence of imported energy to create an hourly demand-related price for billing;

disseminating condensed economic data to consumers by means of printed matrix-bills and then by periodic radio broadcasts of hourly indices which are received in display devices located on consumer premises; and then billing consumers using their calendar-time watt-hour meter data multiplied by said final import-adjusted, demand-related prices to generate hourly charges onto which are added any bonus/surcharge attributions with said sum total, over any billing period, representing the net billed amount.

* * * * *